United States Patent [19]

Mattson et al.

[11] Patent Number: 4,490,910
[45] Date of Patent: Jan. 1, 1985

[54] CUTTING HEAD FOR STRING TRIMMER

[75] Inventors: Charles A. Mattson, Woodland Hills; Richard J. Landy, Canoga Park, both of Calif.

[73] Assignee: Allegretti & Co., Chatsworth, Calif.

[21] Appl. No.: 400,443

[22] Filed: Jul. 21, 1982

[51] Int. Cl.³ ............................................. A01D 55/18
[52] U.S. Cl. ....................................... 30/276; 30/347; 56/12.7
[58] Field of Search ..................... 30/276, 347; 56/12.7

[56] References Cited

U.S. PATENT DOCUMENTS

| 3,708,967 | 1/1973 | Geist | 56/12.7 |
|---|---|---|---|
| 3,826,068 | 7/1974 | Ballas | 56/12.7 |
| 3,859,776 | 1/1975 | Ballas | 56/12.7 |
| 4,035,912 | 7/1977 | Ballas | 30/276 |
| 4,052,789 | 10/1977 | Ballas | 30/276 |
| 4,054,992 | 10/1977 | Ballas | 30/276 |
| 4,161,820 | 7/1979 | Moore | 30/276 |
| 4,167,812 | 9/1979 | Moore | 30/276 |
| 4,168,572 | 9/1979 | Ewing | 30/276 |
| 4,189,830 | 2/1980 | Pittinger | 30/276 |
| 4,189,833 | 2/1980 | Kwater | 30/276 |
| 4,269,372 | 5/1981 | Kwater | 30/276 |

Primary Examiner—Jimmy C. Peters
Attorney, Agent, or Firm—Fulwider, Patton, Rieber, Lee & Utecht

[57] ABSTRACT

An improved cutting head for a string trimmer, wherein a spool holding a length of flexible line is located on and driven by a motor drive shaft, and a housing over the spool is located on the drive shaft and driven by the shaft through the spool, this arrangement reducing the vibration experienced as the string trimmer is operated. The housing is attached to the drive shaft independently of the spool, allowing the spool to be quickly and easily changed, without the need for special tools, by unlocking and removing a hub portion of the housing, slipping the old spool from the drive shaft, slipping on a new spool, and reinstalling the hub.

5 Claims, 10 Drawing Figures

U.S. Patent   Jan. 1, 1985   Sheet 1 of 4   4,490,910
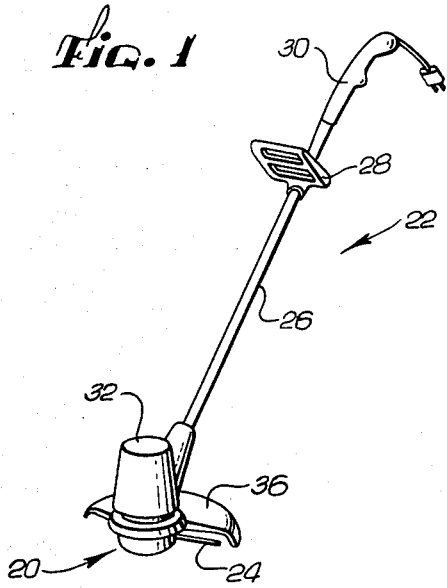
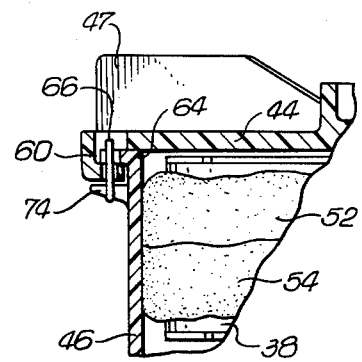
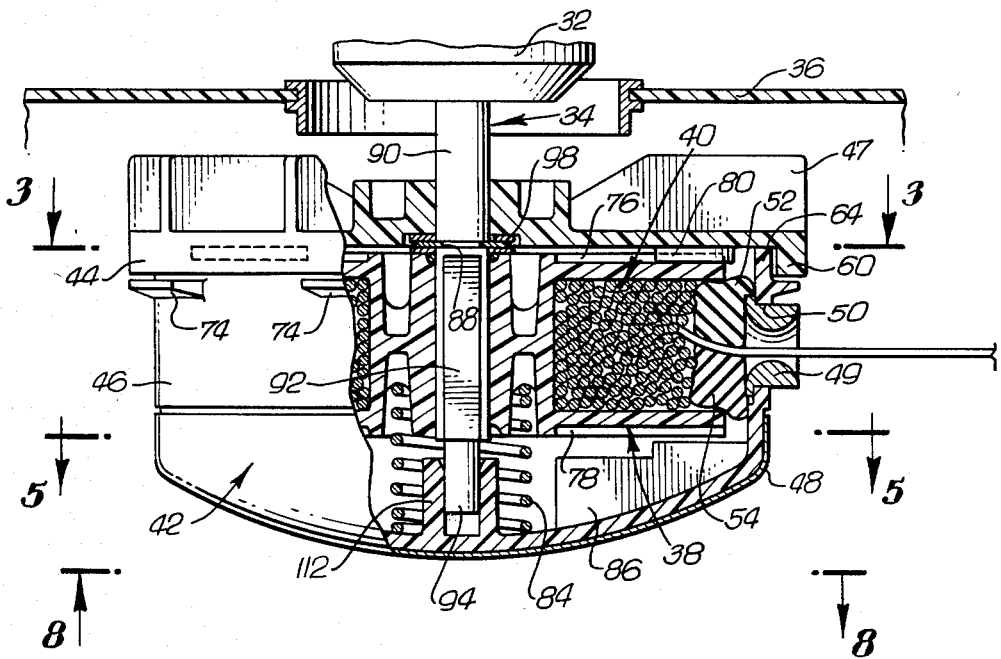

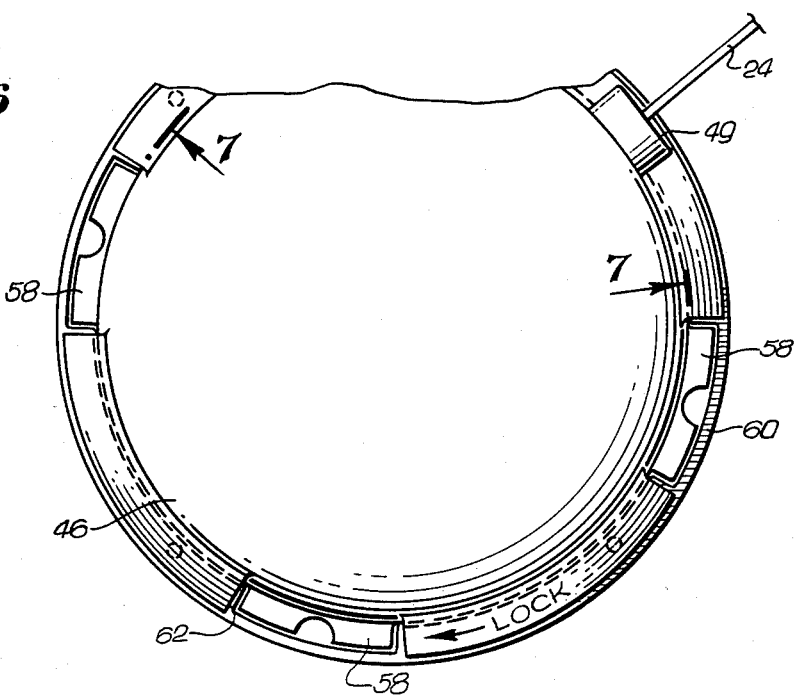
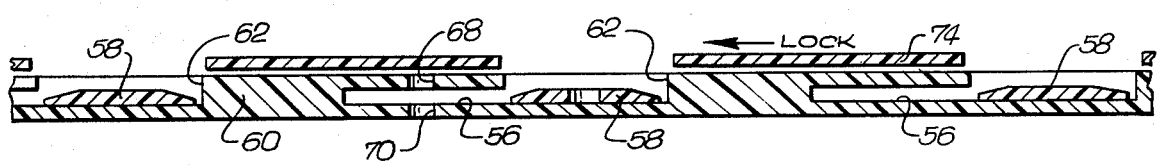
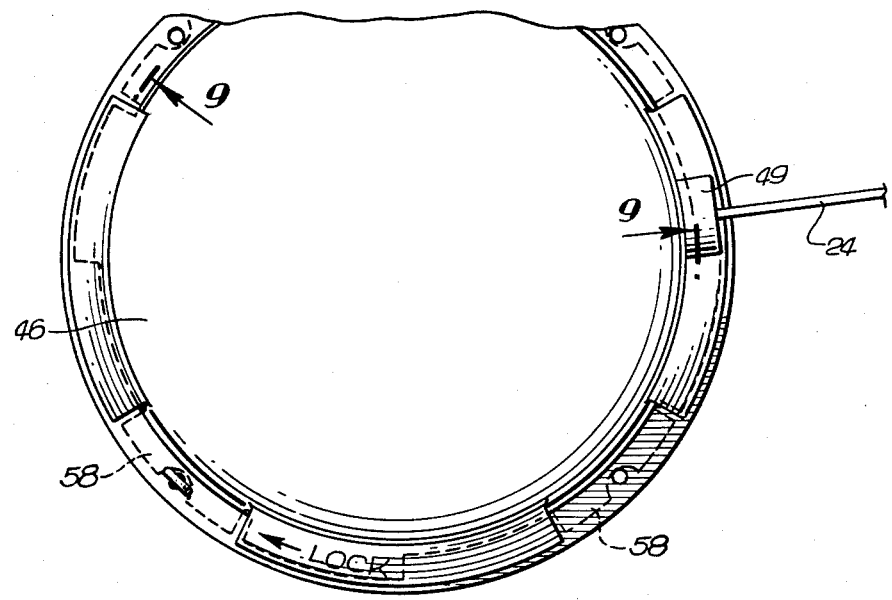
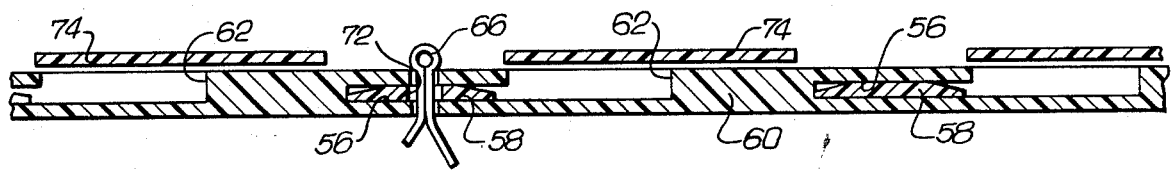

CUTTING HEAD FOR STRING TRIMMER

BACKGROUND OF THE INVENTION

This invention relates generally to machinery for cutting vegetation, and more particularly to a cutting head for use with a string trimmer.

A string trimmer is a device for cutting vegetation by rotating a length of flexible cutting line about an axis at a high rotational rate, on the order of 10,000 rpm. At this high rotational speed, the flexible line extends outwardly from the rotational axis under the influence of centrifugal force with sufficient rigidity that the line can cut tall grass and other relatively thin-stemmed plants. String trimmers enjoy widespread use due to their greater safety as compared with trimmers having rotating blades. Although the rotating cutting line in a string trimmer can sever the stems of small plants, it cannot inflict serious injury on a human hand or foot that accidentally comes in contact with the flexible line, unlike a blade trimmer.

In a typical form, a string trimmer includes a tubular shaft with handles placed at convenient locations and extending downwardly to a gasoline or electric motor and cutting head assembly. A short length of cutting line extends outwardly from the cutting head, and the motor rotates the cutting head rapidly to extend the cutting line outwardly by centrifugal force to cut vegetation as the string trimmer is carried about with the cutting head just above ground level. In its simplest form, the cutting head provides an anchor for holding a short length of the cutting line. However, this simplest form of cutting head requires that the cutting operation be suspended to replace the cutting line in the event that it breaks. Consequently, several designs have been developed for replacing the broken line by extending an additional length of cutting line from the cutting head without turning off the string trimmer.

In one solution to the problem of supplying additional cutting line, a supply of flexible line is wound onto a spool which is attached by an adapter to the motor drive shaft. A housing attached to the adapter covers the spool and includes an opening through which the cutting line can extend. A clutch mechanism locks the housing and the spool together until the housing is tapped against the ground to feed additional line outwardly. When the cutting head is tapped against the ground, the clutch is unlocked so that the spool rotates faster than the housing and feeds an additional short length of line to replace that previously broken off. Upon releasing the contact against the ground, a further short length of line is fed outwardly from the spool and the clutch mechanism is reengaged to prevent further feeding of the cutting line.

Although this "touch and go" string trimmer does feed cutting line, its design suffers from several practical disadvantages. Most importantly, both the spool and the housing are attached to an adapter which is in turn attached to the motor drive shaft, so that the additive effect of tolerances in and clearances between the conventionally plastic parts is sufficient to cause significant unbalance and vibration at high rotational speeds. Additionally, since the spool is bolted to the adapter, replacement of the spool requires special tools, which can be misplaced between uses. Thus, such string trimmers can be uncomfortable and inconvenient to use. Accordingly, there has been a need for an improved "touch and go" string trimmer having reduced vibration and a simplified design for conveniently replacing the spool upon which the flexible line is wound. The present invention fulfills this need, and further provides related advantages.

SUMMARY OF THE INVENTION

The present invention provides a touch and go string trimmer for cutting grass and other vegetation, wherein the vibration of the operating unit is reduced by locating the major rotating parts directly on a drive shaft of a motor to avoid the additive effect of tolerances and clearances between the parts that produce the undesirable vibration. A spool for holding a length of flexible line is held on the shaft by a housing, and the spool can be readily replaced without the need for special tools by removing a lower hub portion of the housing and slipping the spool off the shaft. With this invention, the performance of a string trimmer can be improved by reducing its vibration, while at the same time improving its convenience when changing spools.

In accordance with the invention, the spool upon which the flexible line is wound is located on and rotationally driven by the drive shaft of the motor, and the housing over the spool is located on the drive shaft and driven by the shaft through the spool. In a preferred embodiment of the invention, the drive shaft includes a cylindrical portion upon which a rear plate of the housing is located, and a noncylindrical portion having opposing flat surfaces thereon to engage and drive the spool. The rear plate is fastened to the cylindrical portion of the shaft by a retaining ring and a thrust washer, and the hub is attached to the rear plate by a twist-lock connection. The rear plate and the attached hub may translate upwardly to allow disengagement of a clutch between the spool and the housing, but not downwardly off the drive shaft. The spool is held at its proper longitudinal position on the drive shaft by a spring acting against the hub, so that the spool may be removed by removing the hub and the spring, and sliding the spool from the drive shaft to allow quick and convenient replacement.

It will be appreciated from the foregoing that the present invention represents an advance in the practical utilization of string trimmers. With the mechanical configuration of the invention, vibration produced by the additive effect of tolerances and clearances between plastic parts may be reduced by locating the spool and housing directly on the drive shaft of the motor. Additionally, by fastening the rear plate of the housing to the drive shaft rather than threadably engaging the spool to the drive shaft, removal and replacement of the spool are facilitated.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate a preferred embodiment of the invention. In such drawings:

FIG. 1 is a perspective view of a string trimmer having a cutting head embodying the features of the invention;

FIG. 2 is an enlarged, partial sectional, elevational view of the cutting head of FIG. 1;

FIG. 4 is a fragmented elevational view taken generally on the line 4—4 of FIG. 3;

FIG. 6 is a bottom plan view taken generally on the line 8—8 of FIG. 2, except that the hub is illustrated in the unlocked position;

FIG. 7 is an enlarged fragmented elevational view taken generally on the line 7—7 of FIG. 6;

FIG. 8 is a bottom plan view taken generally on the line 8—8 of FIG. 2, with the hub illustrated in the locked position;

FIG. 9 is an enlarged fragmented sectional view taken generally of the line 9—9 of FIG. 8.

DETAILED DESCRIPTION OF THE PREFERRED EMBODIMENT

Figure 3:
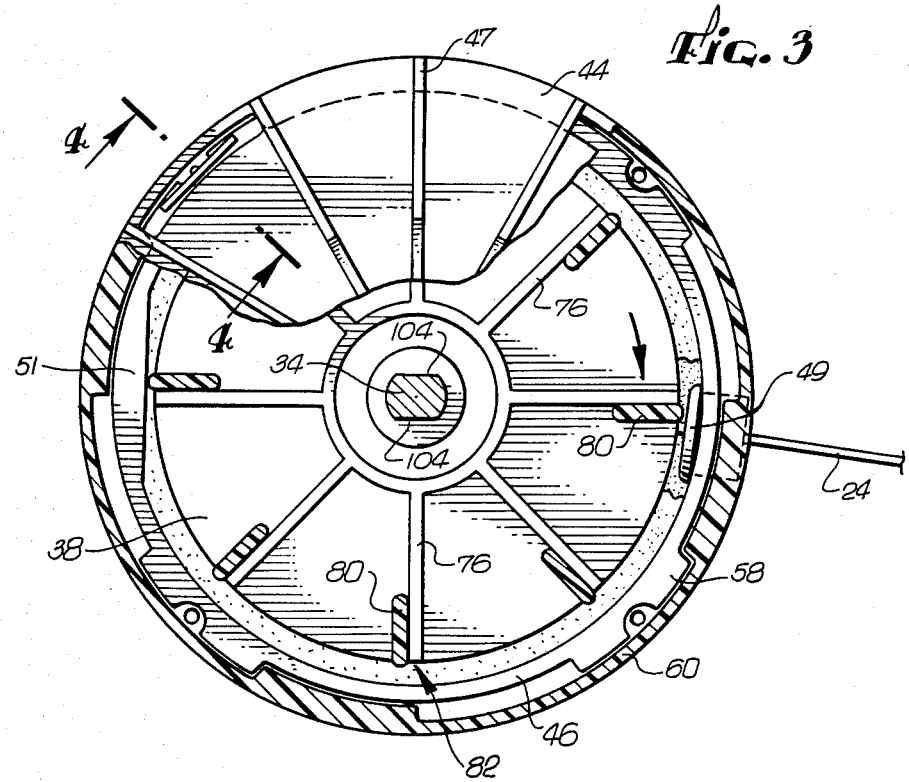
FIG. 3 is a top plan, partial sectional view taken generally in the plane 3—3 of FIG. 2.

As is shown in the drawings for purposes of illustration, the present invention is embodied in a cutting head, indicated generally by the numeral 20, for use with a string trimmer 22, to cut grass and vegetation by the cutting action of a cutting line 24 extending radially outwardly as the cutting head 20 is rotated at high speed. As illustrated in FIG. 1, the string trimmer 22 includes a long shaft 26 with a front handle 28 and a back handle 30 at its upper end for grasping by the person operating the string trimmer 22. At its lower end, the string trimmer 22 includes a motor 32 mounted with a drive shaft 34 generally perpendicular to the ground, so that the cutting head 20 mounted on the shaft 34 and the cutting line 24 extending from the cutting head 20 rotate in a generally horizontal plane as the string trimmer 22 is moved over the ground. A cowl 36 covers the rotating cutting head 22 and the cutting line 24 for operator safety. The motor 32 may be of any convenient type, including gasoline or electric powered as illustrated in FIG. 1, and may be placed at the bottom end of the shaft 26 or at the top end with an extension carrying the rotary power to the cutting head.

Figure 10:
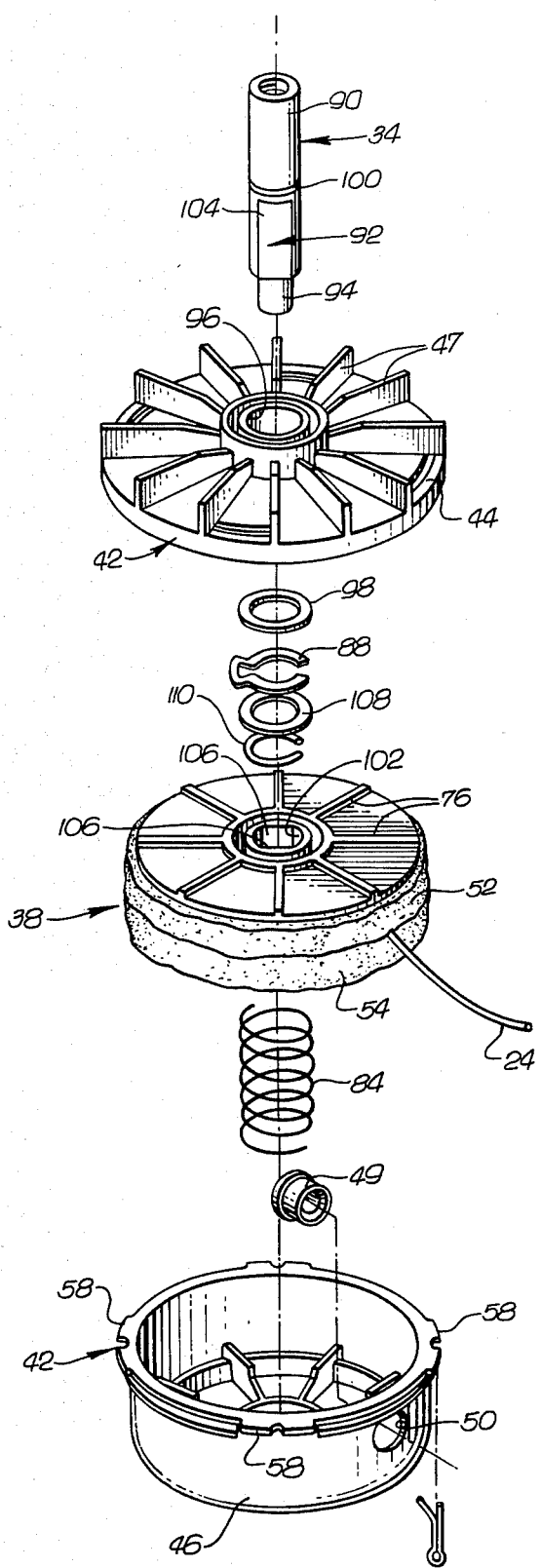
FIG. 10 is an exploded perspective view illustrating the assembly of the components of the cutting head of FIG. 2.

As illustrated in FIGS. 2 and 10, the cutting head 20 of the invention includes the drive shaft 34 extending downwardly from the motor 32 to rotate a spool 38 having a length of flexible line 40 wound thereupon. A housing 42, comprising a rear plate 44 and a hub 46 joined to the rear plate 44 by a twist-lock connection covers the spool 38. A series of circumferentially spaced vanes 47 extend radially outwardly from the top of the rear plate 44 to act as a fan to direct cooling air toward the motor 32. A metallic dome 48 may be attached to the lower outside surface of the hub 46 for protection of the hub 46 against damage and for improved appearance.

Figure 5:
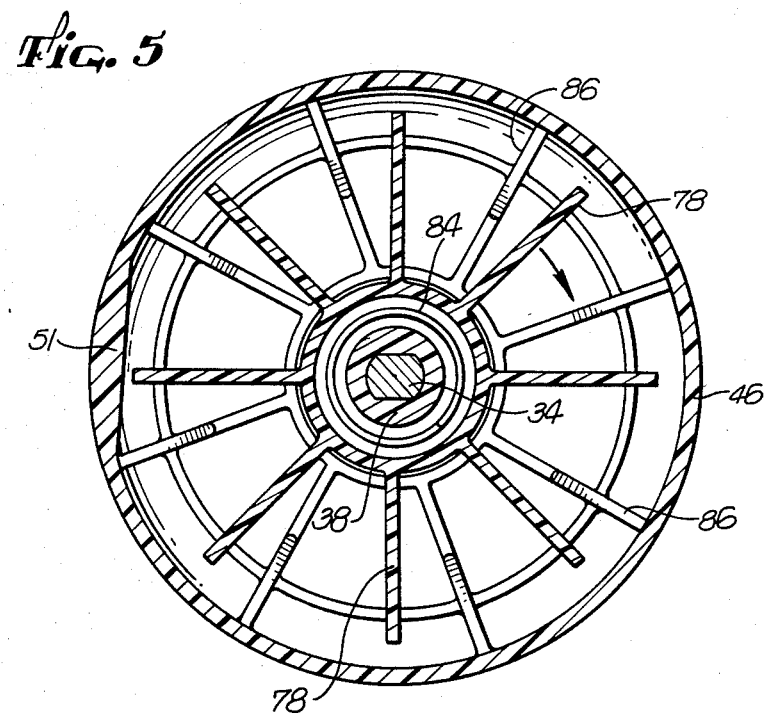
FIG. 5 is a top plan sectional view taken generally on the line 5—5 of FIG. 2.

A length of the flexible line 40 wound upon the spool 38 extends outwardly through an eyelet 49 in a peripheral opening 50 in the hub 46 to form the cutting line 24 which rotates to cut the grass or other vegetation. A pair of annular foam pads 52 and 54 are disposed over the flexible line 40 wound upon the spool 38 to hold the line 40 in place upon the spool 38. The pads 52 and 54 prevent the line from becoming loose upon the spool 38 and tangling during operation of the string trimmer 22. A counterweight 51 (FIGS. 3 and 5) is molded into the hub 46 oppositely disposed from the opening 50, eyelet 49, and cutting line 24 to counterbalance the net weight of these elements, thereby reducing vibration otherwise resulting from any unbalanced weight.

A series of locking recesses 56 in the rear plate 44 cooperate with a correspondingly spaced series of radially projecting locking arms 58 of the hub 46 to form a twist-lock connection that securely joins the rear plate 44 and the hub 46 during operation, yet is readily disconnected for disassembly. The rear plate 44 includes a rear plate engagement rim 60 extending axially from the rear plate 44 at its outer diameter. The periodically spaced locking recesses 56 are formed in the rear plate engagement rim 60 circumferentially adjacent a series of recess openings 62 formed as axial depressions in the lower side of the rear plate engagement rim 60. The hub 46 includes a vertically extending wall with a hub engagement rim 64 at its uppermost extremity, the hub engagement rim 64 having an outer diameter slightly less than the inner diameter of the rear plate engagement rim 60 so that the hub engagement rib 64 can fit within the rear plate engagement rim 60.

The locking arms 58 extend radially outwardly from the vertically extending wall of the hub 46 and are dimensioned and spaced to be received within the recess openings 62 when the hub engagement rim 64 is engaged to the rear plate engagement rim 60, as illustrated in FIGS. 6 and 7. Then, as illustrated in FIGS. 8 and 9, the hub 46 is lockably engaged to the rear plate 44 by turning the hub 46 in the clockwise or "lock" direction. During operation of the string trimmer 22, the line feeding procedure to be described subsequently tends to force the hub 46 into tighter locking engagement with the rear plate 44. Additionally, a cotter pin 66 extending through a pair of cooperating openings 68 and 70 in the rear plate engagement rim 60, and an opening 72 in one of the locking arms 58, may be used to lock the hub 46 and the rear plate 44 together during shipment or when the string trimmer 22 is operating. To prevent the clogging of the recess openings 62 by dirt or cuttings during operation of the string trimmer 22, a series of radially projecting dust cover plates 74 is provided in the hub 46. The dust cover plates 74 are alternately spaced with the locking arms 58 and are spaced and dimensioned to allow the locking arms 58 to be received in the recess openings 62, but then to cover and protect the recess openings 62 when the hub 46 is in the locked position, as illustrated in FIGS. 8 and 9.

The cutting head 20 includes cooperable clutching means so that the spool 38 and the housing 42 are locked together and rotate as a single unit during the cutting of vegetation, but may be selectively unlocked so that the spool 38 may be rotated faster than the housing 42 to pay out additional lengths of flexible line 40 to lengthen the cutting line 24. The spool 38 includes a series of radial upper spool ribs 76 extending upwardly from the upwardly facing surface of the spool 38 and a second series of radial lower spool ribs 78 extending downwardly from the downwardly facing surface of the spool 38. The lower surface of the rear plate 44 includes a series of rear plate teeth 80 cooperable with the upper spool ribs 76 to allow the housing 42 to be rotationally driven by the spool 38. The rear plate teeth 80 extend in a generally radial direction to contact the spool ribs 76, but are slightly offset in a circumferential direction from a true radius of the rear plate 38 to allow a uniform contact along an upper contact surface 82, as illustrated in FIG. 3. When the string trimmer 22 is used to cut vegetation, the spool 38 is rotationally driven by the motor drive shaft 34, and the housing 42 is in turn rotationally driven by the spool 38 through the force transmitted at the upper contact surface 82. In this operating mode, the housing 42 is biased downwardly to insure contact between the upper spool ribs 76 and the rear plate teeth 80 by a coil spring 84 extending from the lower surface of the spool 38 and reacting against the inner surface of the hub 46 to force the housing 42 downwardly.

A series of generally radially extending hub ribs 86 are provided on the inside of the lower surface of the hub 46. As with the back plate teeth 80, the hub ribs 86 extend generally in a radial direction but are slightly offset from a true radius to allow for a radially extending lower contact surface between the lower spool rib 78 and the hub rib 86. When the string trimmer 22 is being used to cut vegetation, the lower spool rib 78 and the hub rib 86 are not in contact but are contacted together only during the line feeding procedure, to be described subsequently. The upper spool ribs 76 and the the lower spool ribs 78 are identically configured, and consequently the spool 38 is top-to-bottom symmetric and may be used without modification for clockwise or counter-clockwise rotating cutting heads.

When the operator desires to pay out additional line, the lower curved portion of the hub 46 is contacted to the ground to force the housing 42 upwardly against the biasing force of the spring 84, thereby disengaging the rear plate teeth 80 from the upper spool ribs 76 so that the spool 38 rotates faster than the housing 42. The spool 38 rotates faster than the housing 42 for a total relative displacement of a fractional portion of a circle, as for example, slightly more than one-sixteenth of a turn in the embodiment illustrated in FIG. 5. After this small relative displacement which feeds flexible line 40 through the eyelet 49 to become cutting line 24, the lower spool ribs 78 contact the hub ribs 86 along the lower contact surface to prevent further relative rotation of the spool 38 and the housing 42. As indicated above, this relative rotation occurs when the housing 42 is forced upwardly as the hub 46 is contacted to the ground.

The second portion of the line feeding procedure is accomplished as the cutting head 20 is lifted upwardly from the ground, so that the housing 42 is urged downwardly relative to the spool 38 by the biasing force of the coil spring 84. As the housing 42 moves downwardly, the lower spool ribs 78 are disengaged from the hub ribs 86 so that once again the spool 38 rotates faster than the cover and additional flexible line 40 is paid outwardly to become cutting line 24. After additional relative movement, slightly less than one-sixteenth of a turn in the illustrated embodiment, the upper spool ribs 76 are contacted against the rear plate teeth 80, but the individual upper spool ribs 76 each respectively contact the next rear plate tooth 80 in a forwardly adjacent position relative to that tooth contacted prior to the line feeding procedure. Thus, the two-step line feeding procedure results in a total relative rotation of the spool 38 and the housing 42 of a fraction of one turn, that fraction being one-eighth of a turn for the illustrated embodiment having eight equally spaced upper spool ribs 76 and eight equally spaced rear plate teeth 80.

In accordance with the invention, the spool 38 is located on and directly driven by the drive shaft 34, and the housing 42 is also located on the drive shaft 34. As used herein, the term "located on" is used to indicate that the drive shaft 34 establishes a center of rotation for an element, and that the element contacts the drive shaft 34 directly without any intermediate part, such as an adapter. Use of "located on" does not require that the drive shaft 34 provide rotational drive to the element directly, as here the drive shaft drives the spool 38, and the housing 42 is in turn driven by the spool 38. Nevertheless, the housing 42 is centered upon the drive shaft 34. The housing 42 is attached to the drive shaft 34 by a retaining ring 88 holding the rear plate 44 to the drive shaft 34. The spool 38 is held in a fixed axial position against the retaining ring 88 by the spring 84 reacting against the hub 46.

The drive shaft 34 includes a cylindrical portion 90 adjacent the motor 32, a noncylindrical portion 92 for engaging the spool 38 axially outwardly from the cylindrical portion 90, and a cylindrical axle 94 at its distal end. The rear plate 44 includes a central axial opening 96 along its axis having a diameter slightly greater than the diameter of the cylindrical portion 90 of the drive shaft 34, so that the rear plate 44 may be placed over and slide and rotate freely upon the cylindrical portion 90. The rear plate 44 is assembled to the cylindrical portion 90 with an upper thrust washer 98 and the retaining ring 88 engaged into a cooperable retaining ring groove 100 in the drive shaft 34 between the cylindrical portion 90 and the noncylindrical portion 92. With this arrangement, the rear plate 44 may slide upwardly on the cylindrical portion 90 of the drive shaft 34 and may rotate with respect to the cylindrical portion 90, but cannot be displaced downwardly past the retaining ring 88.

The noncylindrical portion 92 of the drive shaft 34 engages a cooperatively shaped axial bore 102 in the spool 38. The cooperating noncylindrical shape of the noncylindrical portion 92 and the axial bore 102 allows the spool 38 to be positively rotated by the rotation of the drive shaft 34. In the illustrated preferred embodiment, the noncylindrical portion 92 includes a pair of oppositely disposed flats 104 in the drive shaft 34 to engage a pair of cooperating spool flats 106 in the wall of the axial bore 102. The spool 38 is assembled to the drive shaft 34 with a lower thrust washer 108 adjacent the retaining ring 88 and a wire retaining ring 110 between the lower thrust washer 108 and the spool 38 to hold the lower thrust washer 108 in place.

The axle 94 of the shaft 34 engages a central annular bearing 112 of the hub 46 extending axially upwardly on the inside of the hub 46. With this arrangement, the housing 42 may displace axially along the shaft 34 and rotate with respect to the shaft 34 during the line feeding procedure described previously. The hub 46 is assembled to the rear plate 44 with the coil spring 84 extending between the spool 38 and the inside surface of the hub 46 in compression to bias the housing 42 downwardly with respect to the spool 38.

In the cutting head of the present invention, the spool 38 and the housing 42 are both located upon the motor drive shaft 34, rather than locating the housing 42 upon the spool 38 as in prior cutting heads. Because the spool 38 and the housing 42 are preferably injection molded of plastic, in prior cutting heads the additive effects of the dimensional tolerances and clearances inherently in the spool 38 and the rear plate 44 introduced an undesirable rotational imbalance and vibration at high cutting speeds. Additional additive effects were introduced by engaging the spool 38, rather than the axle 94, to the inside surface of the hub 46. In the present invention, the dimensional stackup of tolerances inherent in the prior arrangement is avoided, thereby reducing the undesirable vibrations.

Additionally, in the earlier cutting heads the spool was bolted to an adapter, which was in turn fastened to the drive shaft, by a threaded fastener which required a special tool for removal. No special fastener is required in the present approach, since the spool 38 may be removed simply by unlocking and removing the hub 46 and the spring 84 and sliding the spool 38 axially away from the motor 32.

In the vegetation cutting procedure using the cutting head 20 of the present invention, the spool 38 is driven by the flats 104, and the spool 38 in turn drives the housing 42 through the upper contact surfaces 82 between the upper spool ribs 72 and the rear plate teeth 80. Additional flexible line 40 may be fed from the spool 38 to become cutting line 24 by contacting the hub 46 to the ground to activate the two-step clutching mechanism. During both cutting and line feeding, unwanted vibration is reduced by locating both the spool 38 and the housing 42 upon the drive shaft 34, rather than using an adapter and locating the housing 42 upon the spool 38.

Although a particular embodiment is described in detail for purposes of illustration, various embodiments may be made without departing from the spirit and scope of the invention. Accordingly, the invention is not to be limited except as by the appended claims.

We claim:

1. A string trimmer cutting head comprising:
   a motor having a rotating drive shaft;
   a spool having a flexible line wound thereupon, said spool engaging and being driven by said drive shaft;
   a housing over said spool, said housing having a peripheral opening so that a length of said flexible line may extend outwardly from said spool through said opening, said housing being selectively lockable to said spool to rotate at the same speed as said spool, and selectively unlockable so that said spool may rotate at a higher speed than said housing to feed flexible line through said opening, wherein said housing comprises a rear plate engageable to said drive shaft and a hub engageable to said rear plate; and
   means for locating said spool and said housing directly on said drive shaft, said means for locating comprising:
   a cylindrical portion of said drive shaft adjacent said motor;
   a central axial cylindrical surface through said rear plate, said surface having about the same diameter as that of said cylindrical portion, so that said rear plate may freely slide and rotate on said cylindrical portion;
   a noncylindrical portion of said drive shaft adjacent said cylindrical portion;
   a central axial noncylindrical surface through said spool, said noncylindrical surface being dimensioned to be driveably engaged by said noncylindrical portion of said drive shaft;
   first means for engaging said rear plate to said shaft to hold said cylindrical surface of said rear plate on said cylindrical portion of said drive shaft; and
   second means for engaging said spool to said shaft to hold said noncylindrical surface of said spool on said noncylindrical portion of said drive shaft.

2. The cutting head of claim 1, wherein said first means comprises:
   a circumferential groove in said shaft between said cylindrical portion and said noncylindrical portion; and
   a retaining ring receivable in said groove.

3. The cutting head of claim 1, wherein said second means comprises:
   a coil spring axially disposed in compression between said spool and the inner surface of said hub.

4. The cutting head of claim 1, further comprising:
   a cylindrical axle at the distal end of said drive shaft; and
   a central axial cylindrical bearing in the inner surface of said hub, said bearing having about the same inner diameter as said axle portion and being dimensioned to receive said axle portion therein.

5. The cutting head of claim 1, wherein said noncylindrical surface of said spool includes a flat thereon.

* * * * *